Figure 1:
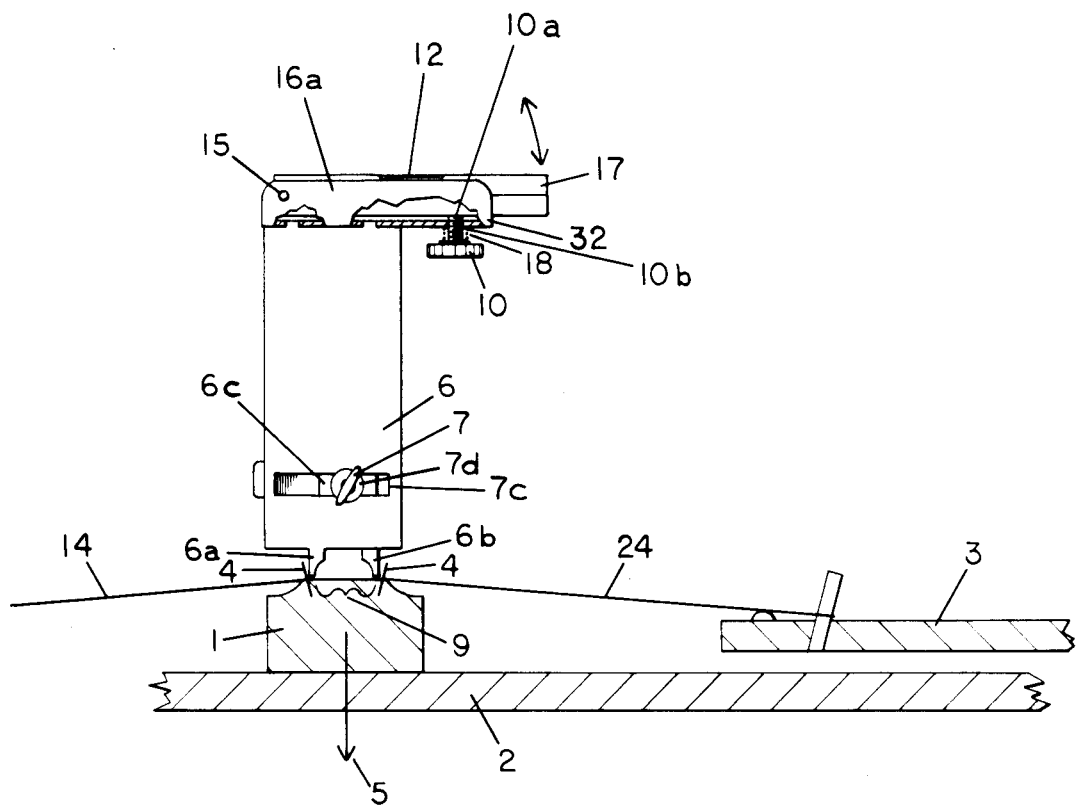

United States Patent [19]

Lowell

[11] Patent Number: 4,798,005

[45] Date of Patent: Jan. 17, 1989

[54] COMPONENT PIANO STRING ANGLE GAUGE

[76] Inventor: Thomas A. Lowell, 7482 Rapp Ln., Talent, Oreg. 97540

[21] Appl. No.: 191,713

[22] Filed: May 10, 1988

Related U.S. Application Data

[63] Continuation of Ser. No. 880,921, Jul. 1, 1986, abandoned.

[51] Int. Cl.$^4$ .............................................. G01C 9/00
[52] U.S. Cl. ........................................ 33/386; 33/343
[58] Field of Search ................ 33/384, 385, 370, 371, 33/365, 386, 387, 388, 343; 84/453, 454, 458

[56] References Cited

U.S. PATENT DOCUMENTS

| | | | |
|---|---|---|---|
| 813,003 | 2/1906 | Horsfall | 33/386 |
| 1,847,728 | 3/1932 | Schmid | 33/384 X |
| 2,567,553 | 9/1911 | Davey | 33/386 |
| 2,842,859 | 7/1958 | Pyciak | 33/386 |

FOREIGN PATENT DOCUMENTS 458763  8/1968  Sweden ................. 33/386

Primary Examiner—Harry N. Haroian

[57] ABSTRACT

An instrument for observing and measuring string segment angles in pianos wherein strings exist in three segments, a speaking string segment, a bridge string segment, and a rear string segment, these three segments creating two angles in the approximate vertical plane, a speaking string segment - bridge string segment angle, and a bridge string segment - rear string segment angle. Subject instrument having the capacity to measure said string segment angles accurately, and directly, without the need for calculations.

6 Claims, 4 Drawing Sheets

COMPONENT PIANO STRING ANGLE GAUGE

This application is a continuation of co-pending application Ser. No. 880,921 filed on July 1, 1986 now abandoned.

This invention relates to the measurement of string segment angles in pianos of an acoustic type construction, wherein strings exist in three segments, a speaking or front segment, a bridge segment, and a rear segment, these three segments creating two angles in the approxiamate vertical plane, a speaking segment-brigde segment angle, and a bridge segment-rear segment angle. While its utility is not so limited, the invention will be described as it relates to grand pianos, which are characterized by the following features and functions: a piano made up of an action (which has keys and associated parts which cause hammers to strike the strings), strings, a soundboard, a string plate which holds the opposite ends of the strings at a constant tension, and positions them in the correct relationship to the soundboard and action, and a case into which the foregoing are fitted. The stringplate, soundboard, and strings occupy substantially parallel planes.

It is a basic object of the invention to provide an instrument which has the capacity to accurately measure in the approximate vertical plane the direction, either positive, negative, or neutral, and the amount of angle which the speaking and rear string segments make in relation to the approximate horizontal line of the bridge string segment.

Ancilliary objects of the invention are as follows:

It is an object of the invention to provide an instrument with which one skilled in the art can readily observe the type and amount of angles which the speaking and rear string segments make in the approximate vertical plane in relation to the approximate horizontal line of the bridge string segment, and information allowing one skilled in the art to calculate the approximate downbearing forces occuring at each edge of the bridge.

These and other objects of the invention which will be set forth hereinafter or will be apparent to one skilled in the art upon reading these specifications, are accomplished by those features of construction of which certain embodiments will now be described.

Figure 1A:
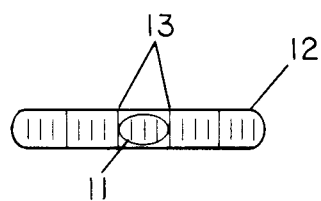
Figure 2:
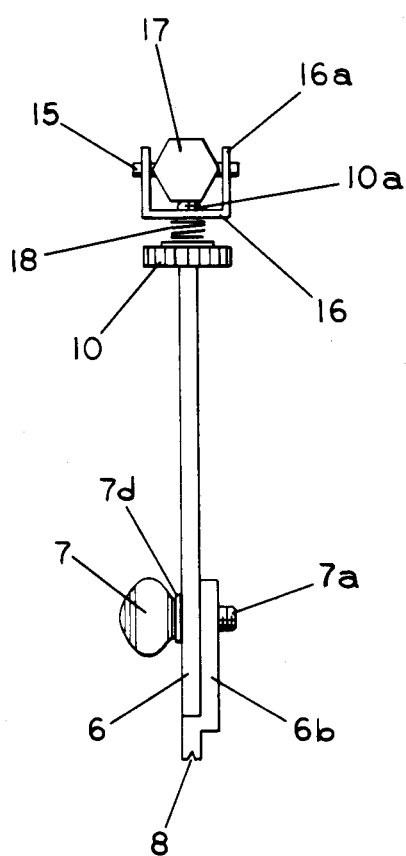
Figure 3:
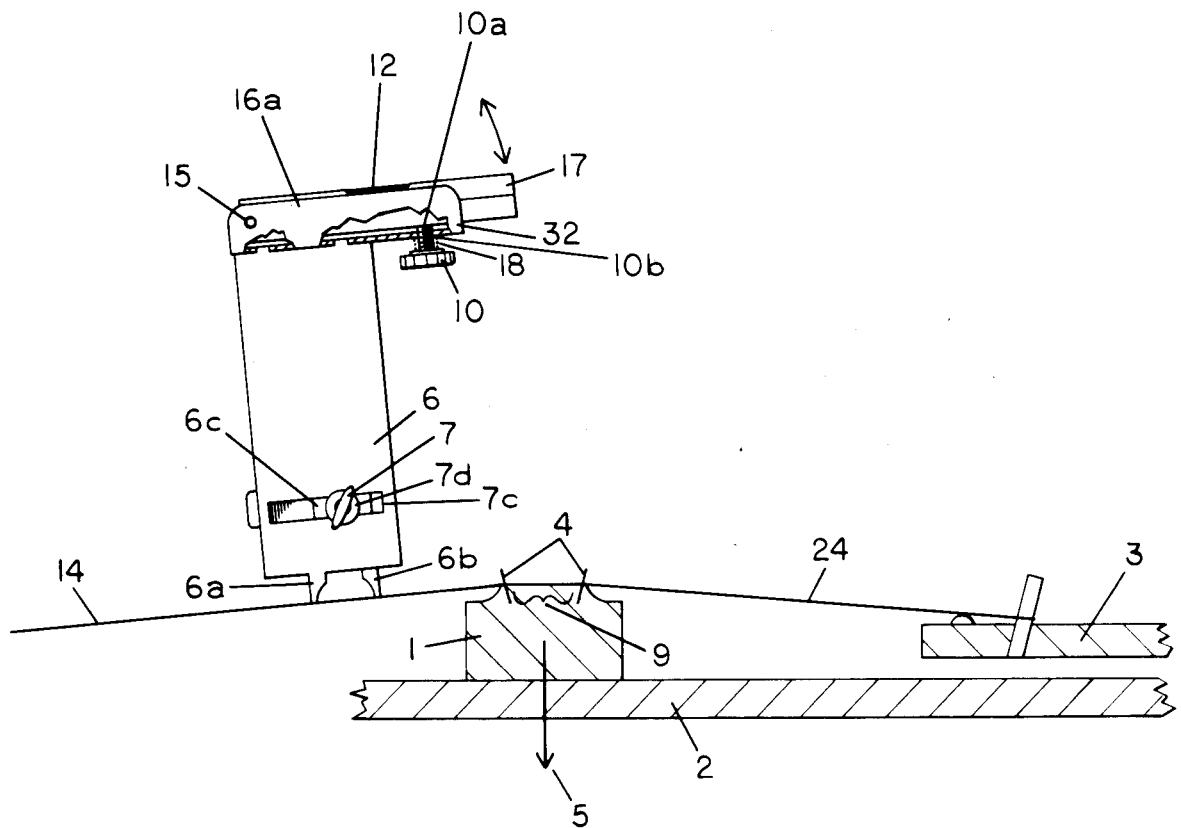
Figure 3A:
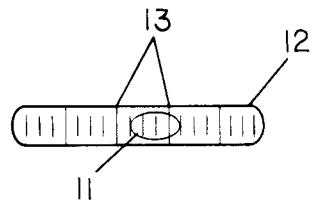
Figure 4:
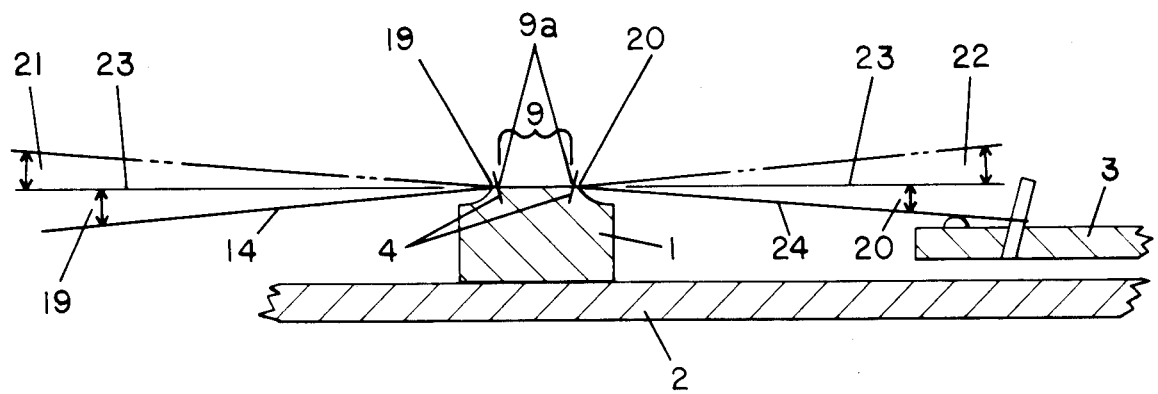
Figure 5:
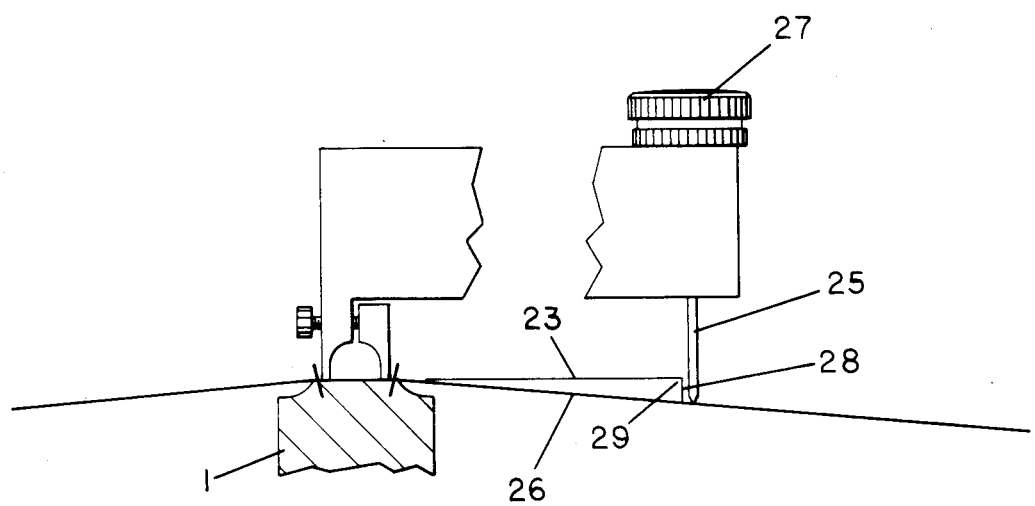

FIG. 1 is a partial sectional view of a part of a piano string frame and soundboard assembly, and a side elevation view of the present invention positioned on the bridge string segment FIG. 1a is a plan view of the vial portion of the present invention callibrated to a zero position FIG. 2 is a front elevation view of the present invention FIG. 3 is a partial sectional view of a part of a piano string frame and soundboard assembly, and a side elevation view of the present invention positioned on the speaking string segment FIG. 3a is a plan view of the vial portion of the present invention showing a bubble position changed from that shown in FIG. 1a FIG. 4 is a partial sectional view of a part of a piano string frame and soundboard asembly showing string segments and their potential angles FIG. 5 is a partial sectional view of a part of a piano bridge showing a right triangle which right triangle's hypotynuse is superimposed upon a string segment Bridges 1 affixed to the soundboard 2 couple the strings to the soundboard so that the vibrational energy imparted to the strings when struck by the hammers can be transmitted with the best effect to the soundboard. The strings are held in tension across the top of the bridge by the string plate 3 and are connected to it in part by being deflected by nail like pins 4 fitted into the tops of the bridges. The downward force exerted by the strings upon the top of the bridges will hereinafter be designated as downbearing 5.

Therefore it is desireable that the bridge create the proper point of deflections and string segment angles, in order to provide positive termination points for the speaking and rear string segments, and to provide the proper amount of downbearing force to couple the strings correctly through the bridge to the soundboard, and to provide the correct compression of the soundboard for maximum resonance and tonal clarity.

The present invention, a description of which follows, provides a means to easily and accurately measure the angles which front and rear piano strings make relative to the piano bridge string segment.

The components $6a, 6b, 6c, 7, 7a, 7c, 7d, 8$ of the base 6, which are described below comprise the bridge string segment locating means of the present invention in its preferred embodiment. The base 6, is provided with gauging fingers $6a, 6b$ whose inner surfaces form inverted V shaped bearing surfaces 8, so that the base 6 will center itself when placed longitudinally on a line of piano string 9, 14, 24. The sliding gauging finger $6b$ has its upper portion $6c$ fitted into a longitudinal slot $7c$ which is located in the main body of the base 6 so that it may slide either closer or further away from the stationary gauging finger $6a$. Extending from the locking knob 7 is a machine screw $7a$, which passes through a washer $7d$ and then is engaged by a threaded hole in the upper portion $6c$ of the sliding gauging finger $6b$, which is loosely located in the slot $7c$ in the base 6. The length of the slot $7c$ substantially exceeds the length of the upper portion of the gauging finger which fits into the slot. The span of the gauging fingers $6a, 6b$ is adjustable by loosening the locking knob 7 and moving the sliding gauging finger $6b$ towards or away from the stationary gauging finger $6a$, and then tightening the locking knob 7 to retain the desired span.

The angle measuring means portion 32 of the present invention in its preferred embodiment is described below. Between the longitudinal ribs $16a$ of the channel shape support 16 is pivotally supported a vial case 17 containing a spirit level vial 12 having a confined air bubble 11. for the location of the air bubble 11 within the vial 12. One end of the vial case 17 is loosely connected to the ribs $16a$ by means of a pivot pin 15 passing through the ribs $16a$ and also the vial case 17.

The means for controllably coupling the base 6 which comprises the bridge string segment locating means, to the angle measuring means 32, comprises a callibration knob 10 from which a machine screw $10a$ extends and is threadingly engaged in a hole $10b$ in the bottom of the channel shaped support 16. The machine screw $10a$ bears against the underside of the free end of the vial case 17. The rotation of the callibration knob 10 causes the free end of the vial case 17 to raise or lower as the case may be, thus allowing the bubble to be controllably coupled to the position of the base so to allow a suitable initial positioning of the bubble as needed. The callibration knob tension spring 18 surrounds the machine screw $10a$ and bears on its upper side against the underside of the channel shaped support 16 and on its lower side against the callibration knob 10.

To use the present invention in its preferred embodiment, locate the the adjustable span gauging fingers 6 to fit between the bridge pins corresponding to the piano string whose angles are to be measured. Next tighten the locking knob 7. Next locate the vee groove 8 on the bottom of said adjustable span gauging fingers flush to the bridge string segment 9 between said bridge pins, and in the approximate vertical plane to the approximate horizontal plane of the bridge string segment. While maintaining the instrument in the above position, rotate the calibration thumbscrew 10 either clockwise or counterclockwise as needed to center the air bubble 11 in the liquid filled vial 12 between the two centermost lines 13 of said vial. FIG. 1a shows said bubble callibrated to its zero position while the invention is positioned upon said bridge string segment. To determine the direction of travel and the slope said bridge string segment makes relative to the speaking string segment 14 the invention is next positioned upon said speaking string segment as shown in FIG. 3. FIG. 3a shows s bubble position of one division away from its original position as shown in FIG. 1a. The direction of movement shown is that towards the bridge indicating a positive angle in the amount of 10 (ten) minutes.

The pivot pin 15 is fixed to the vial channel 16 and rotates freely in the vial case walls 17 thus allowing the callibration thumbscrew to raise or lower the vial body, thus allowing the vial bubble to be centered within the vial body, when said callibration thumbscrew is rotated. The thumbscrew tension spring 18 places friction on the callibration knob to maintain a static state when not being manipulated by the operator.

19,20,21,22 represent string angles which present invention can measure. These angles exist in the approximate vertical plane and are of the projected line of the bridge string segment termination points 23 relative to the speaking and rear string segments. 19a and 20a represent the vertices of the angles which the present invention measures, the ventices being at the same approximate location as the bridge string segment termination points 9a. These angles may be positive 19,20 thus exerting a downward force upon the bridge and soundboard or negative 21,22 thus exerting an upward force upon the bridge and soundboard. The direction of this force, either upward or downward, the amount of this force, and the distribution of this force relative to the front and rear edges of the bridge, are critical to tone production in pianos. The resultant downbearing forces of FIG. 4 can be calculated using the following formula:

Downbearing force=(Tang angle 2 FIG. 6+Tang angle 4 FIG. 6)(Horizontal string tension)

As it is preferable to achieve a positive string angle on both the speaking string segment and the rear string segment 24, it is then important to be able to measure these angles individually.

Modifications of the present invention may be made without departing from the spirit thereof. For example, the method of callibrating the bubble to the bridge string segment by changing the elevation and angle of the vial case can be altered such as: (a) having the vial case pivot on a pin in the center of the vial case, or (b) having the callibration thumbscrew thread through the vial case to rest upon the housing in contrast to present instrument, or (c) having the entire housing pivot on the main body of the tool with the vial case remaining stationary in the housing. For example, the sensitivity of the vial from which the amount of angle is discerned may be altered from the present 10 minute sensitivity to either a greater or a lesser sensitivity. For example, the configuration of the gauging fingers which rest upon the various string segments may be altered such as: having them be made to a non-adjustable span as in a more primitive form of the present invention; having the gauging fingers attach directly to the underside of the vial housing, said housing having a chamfered slot through which flat head machine screws are threaded into gauging fingers free to slide along the length of the slot until the screws holding them are tightened down at the span desired; having the gauging fingers widened so that they can span two adjacent strings, and eliminating the body of present invention so that the gauging fingers attach and are adjustable to the housing of the vial case as previously described-this, with the help of a magnet located above the ferrous gauging fingers in the housing, allowing the gauge to rest upon the strings unaided. For example, the use of a bubble to measure the angles may be replaced with a dial indicator whose probe is mounted atop the adustable span gauging fingers, and in the same plane, said probe being mounted a specified distance from the outside edge of the fixed gauging finger so that when said probe 25 is resting upon desired speaking 26 or rear string segment said dial indicator 27 will register the distance 28 above or below the projected line of the bridge string termination points 23 said string segment is located. Said indicator probe being affixed above and at a distance from said adjustable span gauging fingers at a 90° angle 29 relative to the plane of the underside of the adustable span gauging fingers, and thus the projected line of the bridge string segment termination points.

The embodiments of the invention in which an exclusive property or privilige is claimed are defined as follows:

1. A component piano string angle gauge, for piano strings which strings each comprise a front string, a bridge string segment where the piano string is in contact with a piano bridge, and a rear string, for use in the measurements of angles between the front strings and rear strings and a projected line between a pair of bridge string segment termination points, the bridge string segment termination points being the location of the intersection between the front and rear strings and the bridge string segment, said component piano string angle gauge comprising:
   a. a base;
   b. two gauging fingers, extending from the base, having string contacting bearing surfaces on their ends;
   c. means for adjusting the relative distance between the two gauging fingers, whereby the relative distance between the gauging fingers may be increased or decreased so as to allow placement of the string contacting bearing surfaces of the gauging fingers at the bridge string segment termination points;
   d. angle measuring means mounted to said base; and
   e. means for calibrating said angle measuring means relative to the position of the string contacting bearing surfaces of the gauging fingers.

2. The component piano string angle gauge, as recited in claim 1, wherein the two gauging fingers with string contacting bearing surfaces on their ends include one of said fingers being a stationary gauging finger extending as a narrow projection from the lower edge of the base, and the other finger being a movable gauging finger located in the same vertical plane as the stationary gauging finger.

3. The component piano string angle gauge, as recited in claim 2, wherein the means for adjusting the relative distance between the stationary gauging finger and the movable gauging finger comprises a longitudinal slot located in the lower portion of the base, the length of the longitudinal slot exceeding substantially the length of an upper portion of the movable gauging finger, which upper portion fits loosely inside the longitudinal slot; a pin which is at one end threaded into the upper portion of the movable gauging finger and having at its other end a knob; a washer, of larger diameter than the height of the slot, being sandwiched between the knob and base, so that when the threaded pin is rotated into the upper portion of the movable gauging finger, the inner surface of the knob bears against the washer and base without bearing against the upper portion of the movable gauging finger, the outer surface of the movable gauging finger being recessed slightly from the outer surface of the base which the washer bears against, so that the movable gauging finger remains in a temporary fixed position relative to the base and thus the stationary gauging finger.

4. The component piano string angle gauge, as recited in claim 1, wherein the angle measuring means includes a bubble vial and the means for calibrating said angle measuring means relative to said gauging fingers on said base includes said bubble vial being mounted in a vial case supported pivotally at one end in a channel-shaped support by a pivot pin passing through said vial case and said support, the free end of the vial case bearing upon an end of a rotatingly adjustable calibration shaft projecting upwards from the bottom of the channel-shaped support where it is threadingly engaged, said bottom of the channel-shaped support being fixedly mounted to said base.

5. A method for the measurement of piano strings angles, and specifically, where a piano string comprises a front string, a bridge string segment where the piano string is in contact with a piano bridge, and a rear string, the measurement of the angle between the front string or the rear string and a projected line between a pair of bridge string segment termination points, the bridge string segment termination points being the location of the intersections between the front and rear strings and the bridge string segment, the steps for measurement comprising:

a. locating a piano string angle gauge, having two gauging fingers extending from the base, so that string contacting bearing surfaces of the gauging fingers contact the bridge string segment termination points;

b. calibrating the angle measuring means, adjustably mounted to the base of the piano string angle gauge, to a reference position;

c. removing the string contacting bearing surfaces of the gauging fingers of the piano string angle gauge from the bridge string segment termination points;

d. repositioning the string contacting bearing surfaces of the gauging fingers upon the front string, if the angle associated with the front string is to be measured, or upon the rear string, if the angle associated with the rear string is to be measured; and e. reading the angle measuring means, in conjunction with the reference position determined with the device at the bridge string termination points, so as to measure the angle between the front or rear string upon which the gauge now bears and the projected line between the bridge string segment termination points.

6. The method for measurement of piano string angles, as recited in claim 5, wherein an additional antecedent step is included:

adjusting the relative distance between the two gauging fingers to allow placement of the string contacting bearing surfaces of the gauging fingers at the bridge string segment termination points.

* * * * *